United States Patent Office 2,839,322
Patented June 17, 1958

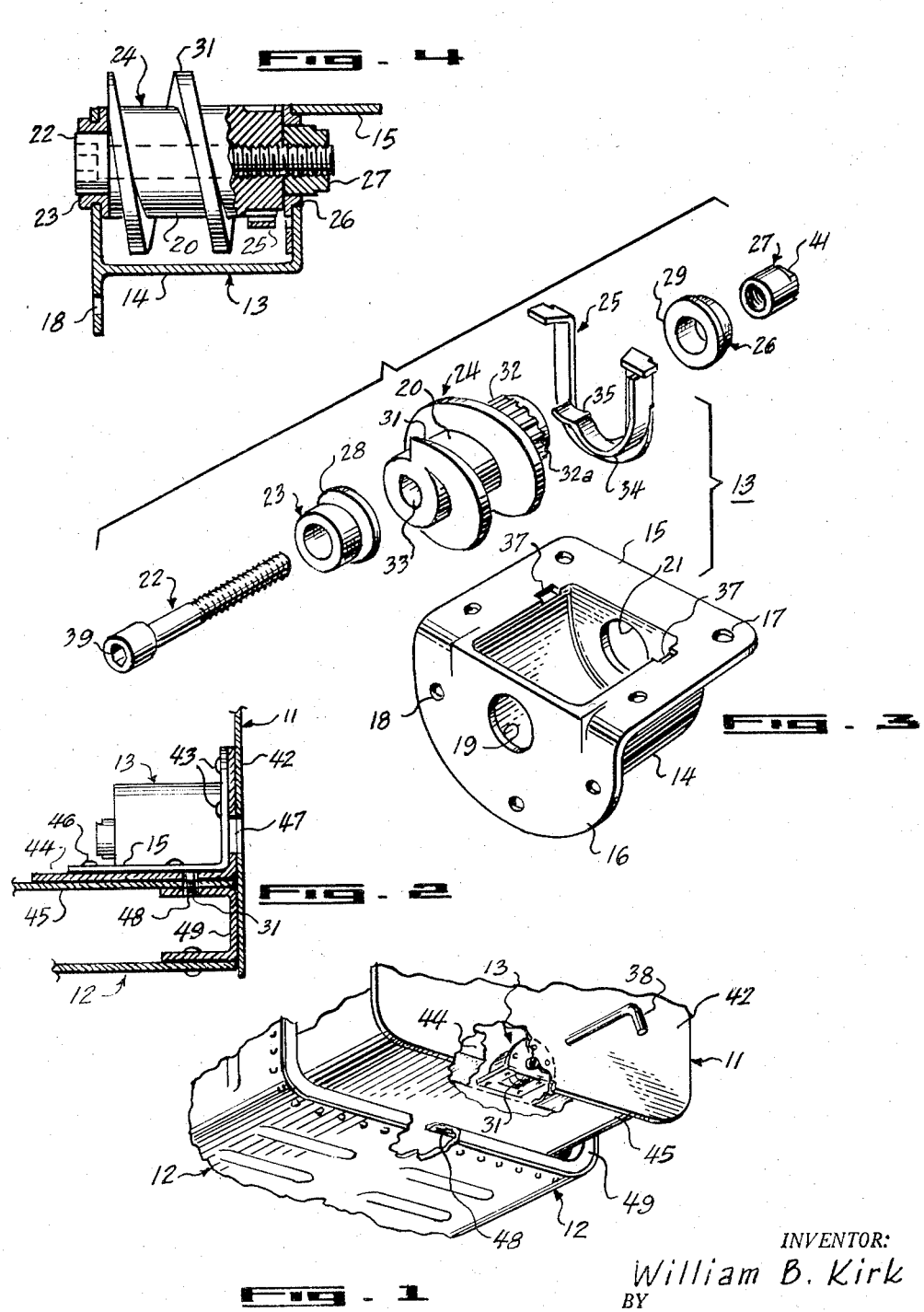

2,839,322
SECURING DEVICE

William B. Kirk, Fort Worth, Tex., assignor to General Dynamics Corporation, San Diego, Calif., a corporation of Delaware Application August 30, 1955, Serial No. 531,553

6 Claims. (Cl. 292—251)

The present invention relates to securing devices, and more particularly to an actuating and locking mechanism operable to exert comparatively high locking and unlocking forces.

Drawers and movable receptacle elements of a related nature are occasionally employed in situations where a fairly great effort is required to open and close such drawers. For example, various electronic units in aircraft are integrally mounted on a sliding rack or drawer, the units being housed in a cabinet or the like upon closure of the drawer. Such an arrangement permits the drawer to be opened at any time for inspection and servicing of the electronic units, and the rear or inward end of the drawer is usually provided with male or female fittings which are adapted to mate with appropriate fittings at the rear of the cabinet to effect electrical connection therebetween. Further, since it is often required that the drawer of electronic equipment be provided with a supply of cooling air to offset the heat generated by the equipment, closure of the drawer conventionally effects engagement between cooling ducts, pressurization lines, and rubber sealing lips and recesses therefor carried by the drawer and cabinet. Such sealing lips or means together with the great number of electrical and mechanical connections previously mentioned, require that a considerable closing or opening force be exerted to move the drawer. A specific example is the connection of a single electrical plug and its matching receptacle which, with its typical thirty-two engaging pins, often requires forces as high as 15 pounds for engagement. It is not uncommon that a total force of one hundred twenty pounds is necessary to effect engagement of the plugs in a drawer filled with many units of electric equipment. Further, pressure connections for a typical drawer usually each require an additional fifteen pounds of closure force.

In the present invention, an actuating and locking mechanism is provided to obtain sufficient mechanical advantage to enable closure of such drawers, or similar movable assemblies, with a minimum of effort. The mechanism of the invention cannot be inadvertently operated, it is light in weight, compact, flush mounted, and simple to manufacture. It is designed to rotatably engage with a suitable slot or the like in the structure with which the drawer is associated, such engagement being characterized by an absence of undesirable vibration.

It is a principal object of the present invention to provide an improved locking mechanism characterized by a high mechanical advantage, and which is adapted to effect engagement between a pair of assemblies which are movable with respect to each other.

Another object of the invention resides in the provision of a novel locking mechanism which embodies a rotatable element which is adapted to forcibly effect a locking operation and which is comparatively free of vibration during a locking operation.

A further object of the invention is to provide a unique closure device that is compact in design, light in weight, and adapted to be operated readily and simply.

Still another object of the invention is the provision of an improved closing device which may be flush mounted and which is adapted for inexpensive manufacture.

Other objects and features of the present invention will be readily apparent to those skilled in the art from the following specification and appended drawings wherein is illustrated a preferred form of the invention, and in which:

Figure 1 is a partial perspective view of a locking mechanism in accordance with the present invention, as shown in a typical installation;

Figure 2 is an elevational view of the installation of Figure 1;

Figure 3 is an exploded perspective view of the locking mechanism, shown in an inverted position; and Figure 4 is an elevational view, partly in section, of the locking mechanism shown in Figure 3.

Referring to the drawings, and first more particularly to Figures 1 and 2, there is illustrated an embodiment of the invention which is adapted for securing a receptacle unit or drawer 11 within a mounting base or rack 12. Drawer 11 is assumed to support a variety of electronic equipment which is adapted to mate with receptacles or the like (not shown) carried by rack 12, with the mating therebetween requiring substantial force. For the most part, the particular construction of drawer 11 and rack 12 is not important to the present invention, it being important only that some support be provided by drawer 11 for the mounting of the present closing device, which is generally designated 13, and that some means be provided by rack 12 for the engagement of device 13 with structure of rack 12, as will be hereinafter described. It will be apparent that the closing device of the present invention is thus not to be limited to the application herein described, but is to be considered applicable to a variety of applications wherein a comparatively high closure force is required. If desired, device 13 could be mounted to rack 12, and engagement means be carried by drawer 11, as will be apparent to one skilled in the art.

Referring now to Figures 3 and 4, closing device 13 comprises, generally, a substantially semicylindrical housing 14 which embodies an integral flange or base 15 and a downwardly extending vertical flange 16. Base 15 and flange 16 each are provided with a suitable plurality of openings 17 and 18, respectively, whereby device 13 may be secured to drawer 11, as will be seen. Within the hollow interior of housing 14, and fitted in horizontal alignment with a pair of openings 19 and 21 provided in the front and rear faces, respectively, of housing 14, are a socket head cap screw 22, a forward bushing 23, a rotatable worm or cam element 24, a spring element 25, a rearward bushing 26, and a jam-nut 27. Bushings 23 and 26 are wedged or press-fitted within openings 19 and 21 of housing 14, and bushing 23 is preferably somewhat deformed about its outer periphery, as illustrated, for improved securement to housing 14 at opening 19. A peripheral flange 28 of bushing 23, and a peripheral flange 29 of bushing 26, serve to abut against the inner forward and rearward end faces, respectively, of housing 14 whereby bushings 23 and 26 serve as thrust bearings during the operation of closing device 13.

Cam element 24 includes a radially outwardly extending worm, helical, or spiral portion 31 which is integral with and formed about the periphery of the cylindrical center body 20 of cam element 24. Portion 31 is preferably disposed about the center body of element 24 approximately one and one-half revolutions. Integral with cam element 24 and positioned axially to the right, as viewed in Figure 3, of the rearward or inner terminus of spiral portion 31, is a ridged portion 32 which embodies a plurality of flutes or ridges 32a which cooperate with spring element 25, as will be seen, so that ridged portion 32 serves as a double acting ratchet.

Cam element 24 embodies an axial bore 33 which is threaded at its inner end portion to threadably accept cap screw 22, screw 22 being adapted for disposition through bore 33, and for threaded connection to jam-nut 27 to secure cam element 24 in position within housing 14. Jam-nut 27 serves to rigidly secure cap screw 22 to cam element 24 so that upon assembly of screw 22, element 24, and nut 27, these components act as an integral unit, as will be seen. Further, the head of cap screw 22 is adapted to be slidably positioned and rotatably operable within the inner bore of bushing 23, and, similarly, jam-nut 27 is adapted to be slidably positioned and rotatably operable within the bore of bushing 26 so that cap screw 22, cam element 24, and jam-nut 27 are rotatably carried by bushings 23 and 26. It is noted that the threaded portion of bore 33 is threaded in a direction so that upon clockwise rotation of screw 22, element 24 will be tightened upon screw 22.

Spring element 25 is provided to maintain any rotated position of cam element 24 and prevent inadvertent rotation thereof while yet enabling element 24 to be turned by deliberate rotation of cap screw 22. Spring element 25, as shown, is generally U-shaped in configuration, and embodies an integral U-shaped flexible blade element 34 having a detent 35 which is adapted to mate with the ridges of ridged portion 32 of cam element 24. The upper ends of spring element 25 embody integral, horizontally disposed and outwardly extending tabs 36 which are adapted to engage with mating recesses 37 provided in housing 14 to support element 25 in position within housing 14. With this construction spring element 25 by its cooperation with the ridges 32a serves to prevent inadvertent rotation of cam element 24, particularly rotation which might otherwise occur under conditions of vibration. Cam element 24 may be deliberately rotated, however, since blade element 34 is adapted to flex sufficiently to permit detent 35 to disengage from its nested relationship with the ridges 32a of portion 32, and to override such ridges.

Upon assembly of cam element 24 within housing 14, Figure 1, cap screw 22 is tightened in position, as by a wrench 38 fitted into a suitable hexagonal opening 39 provided in the head of screw 22, and jam-nut 27 is secured during such assembly by suitably engaging a pair of flats 41 thereon with a wrench or the like. It is noted that the inner faces of the cap of screw 22, and of jam-nut 27 are then tightly in abutment with the adjacent ends of cam element 24. It is a feature of this construction and assembly that cam element 24 may be rotated in either direction without cap screw 22 becoming inadvertently loosened.

As illustrated in Figures 1 and 2, flange 16 of housing 14 of closing device 13 is secured to a forward panel 42 of drawer 11 by suitable fastening means such as a plurality of rivets 43 disposed through opening 18, and base 15 of housing 14 is secured to an angle 44 and a bottom panel 45 of drawer 11 by a plurality of flush rivets 46 disposed through openings 17. Further, a suitable opening 47 is cut through angle 44 and through panel 42 of drawer 11 so that the protruding portion of closing device 13 is housed therein and a flush relationship is provided between panel 42 and such protruding portion. In addition, a diagonal notch or opening at 48 is provided through angle 44 and panel 45 of drawer 11, and through a channel 49 of rack 12 for the accommodation of the downwardly extending spiral portion 31 of cam element 24, as will be described.

It is noted that angle 44 of drawer 11, and channel 49 of rack 12, are each secured to drawer 11 and rack 12, respectively, by any suitable means so that loads imposed upon angle 44 and channel 49 are distributed to the drawer 11 and rack 12, as will be obvious.

With this construction, initial closure of drawer 11 will urge the downwardly depending spiral portion 31 of cam element 24 into contact with the upper outward edge of channel 49 of rack 12. Spiral portion 31 is then rotated clockwise until the inner terminus or end of spiral portion 31 enters opening 48, whereupon continued clockwise rotation of portion 31 causes portion 31 to bear against the margin of opening 48 to urge drawer 11 inwardly. In a related manner, counterclockwise rotation of cam element 24 effects a movement of drawer 11 outwardly with respect to rack 12. If desired, the effectiveness and life of the opening 48 in channel 49 may be increased by the employment of a hardened steel reinforcing plate (not shown) which is suitably apertured and secured to channel 49 over opening 48.

It will thus be seen that a simple and effective closing device has been provided by the present invention, which device is characterized by compactness, light weight, and ability to effect a high closure force. The device is relatively simple to manufacture, and is adapted to be flush mounted for convenience, safety, and appearance.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A locking device for a pair of relatively movable structural elements, said device comprising an axially bored rotatable element, said rotatable element including an engaging member extending in helical manner along the axis of said rotatable element, means rotatably supporting said rotatable element upon one of said structural elements, said means including a pair of spaced apart bushings, an axial member disposed through the bore of said rotatable element and having a head portion operable for rotation within one of said bushings, and an element secured to said axial member and adapted for rotation within the other of said bushings whereby said rotatable element, said axial member and said element are adapted for common rotation, said engaging member of said rotatable element being adapted upon operation of the head portion of said axial element to enter into an engaging slot in the other of said structural elements whereby relative movement between said structural elements is effected.

2. A locking device for effecting relative movement between a first structure and a second structure, said device comprising a rotatable member having a ridged portion and a worm element adapted to engage said second structure, mounting means secured to said first structure and including a plurality of spaced apart bearing means for rotatably supporting said rotatable member, and restraining means for exerting a restraining force upon said rotatable member whereby upon rotation of said rotatable member said first structure and said second structure are moved relative to each other and said restraining means in cooperation with said ridged portion of said rotatable member releasably maintains the rotated position of said rotatable member to prevent inadvertent rotation thereof.

3. A locking device for effecting relative movement between a first structure and a second structure, said device comprising a rotatable member having a plurality of peripherally disposed, axially aligned ridges and a worm element adapted to engage said second structure, mounting means secured to said first structure and including a plurality of spaced apart bearing means for rotatably supporting said rotatable member, and ratchet means adapted to releasably rest in said ridges of said rotatable member for exerting a restraining force upon said rotatable member whereby upon rotation of said rotatable member said first structure and said second structure are moved relative to each other and said ratchet means in cooperation with said ridges of said rotatable member releasably maintains the rotated position of said rotatable member to prevent inadvertent rotation thereof.

4. A locking device for effecting relative movement between a first structure and a second structure, said device comprising a rotatable member having a plurality of peripherally disposed, longitudinally extending ridges and a worm element adapted to engage said second structure, mounting means secured to said first structure and including a plurality of spaced apart bearing means for rotatably supporting said rotatable member, and a spring element having an integral detent member, said spring element being mounted adjacent said rotatable member whereby said detent member is biased against said ridges of said rotatable member whereby upon rotation of said rotatable member said first structure and said second structure are moved relative to each other and said detent member of said spring element in cooperation with said ridges of said rotatable member releasably maintains the rotated position of said rotatable member to prevent inadvertent rotation thereof.

5. A locking device for effecting relative movement between a first structure and a second structure, said device comprising a rotatable member having a plurality of peripherally disposed, longitudinally extending ridges and a worm element adapted to engage said second structure, a housing attached to said first structure and having one side open whereby said housing encloses said rotatable member and said worm element projects through said open side, mounting means secured to said housing and including a pair of spaced apart bushings for rotatably supporting said rotatable member, and a spring element having an integral detent member, said spring element being mounted within said housing thereby to effect engagement between said detent member and said ridges of said rotatable member whereby upon rotation of said rotatable member said worm element is adapted to enter into an engaging slot in said second structure to effect relative movement between said first structure and said second structure and said detent member of said spring element in cooperation with said ridges of said rotatable member releasably maintains the rotated position of said rotatable member to prevent inadvertent rotation thereof.

6. A locking device for a pair of relatively movable structural elements, said device comprising an internally bored rotatable element, said rotatable element including an engaging member extending in helical manner along the axis of said rotatable element, means rotatably supporting said rotatable element upon one of said structural elements, said means including a pair of spaced apart bushings, an axial member disposed through the bore of said rotatable element and manually operable for rotation within one of said bushings, and an element secured to said axial member and adapted for rotation within the other of said bushings whereby said rotatable element, said axial member and said element are adapted for common rotation, said engaging member of said rotatable element being adapted upon rotation of said axial element to enter into an engaging slot in the other of said structural elements whereby relative movement between said structural elements is effected.

References Cited in the file of this patent

UNITED STATES PATENTS

| 4,342 | Coleman | Dec. 31, 1845 |
| 1,221,824 | Boye | Apr. 10, 1917 |
| 2,635,751 | Schroeder | Apr. 21, 1953 |